Figure 1:
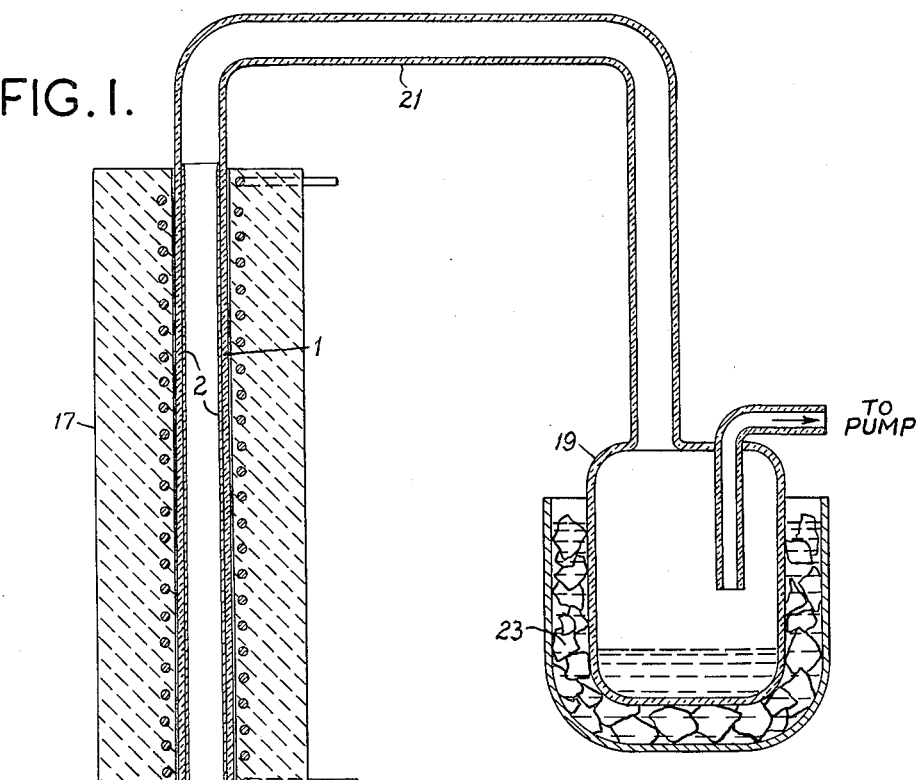

May 30, 1961 W. J. WILSON ET AL 2,986,451
METHOD OF PREPARING ELEMENTAL SILICON
Filed April 30, 1959

Wilbur J. Wilson,
William A. Small,
William B. Burford III,
Inventors.
Koenig and Pope,
Attorneys.

United States Patent Office 2,986,451
Patented May 30, 1961

2,986,451
METHOD OF PREPARING ELEMENTAL SILICON

Wilbur J. Wilson, Columbus, Ohio, and William A. Small, Ferguson, and William B. Burford, III, Webster Groves, Mo., assignors, by direct and mesne assignments, to Mallinckrodt Chemical Works, St. Louis, Mo., a corporation of Missouri Filed Apr. 30, 1959, Ser. No. 809,962

4 Claims. (Cl. 23—223.5)

The present invention is directed to an improved method of preparing ultrapure elemental silicon suitable for use as a semiconductor base material. More particularly it relates to an improved method of preparing a non-adherent deposit of elemental silicon on a quartz surface by thermally decomposing a gaseous silicon compound.

Briefly, the method of the present invention prepares elemental silicon by passing the vapor of a thermally decomposable silicon compound over a quartz surface which is provided with a frangible coating of fritted silica and which is heated to not less than the decomposition temperature of the silicon compound but below the softening point of the quartz surface, whereby a substantially non-adherent deposit of pure elemental silicon is formed on the quartz surface.

The preparation of elemental silicon by thermally decomposing a gaseous silicon compound on a heated filament of tantalum or other inert metal is known in the art. To avoid the problems and complications associated with the use of a heated filament which, with its necessary electrical connections and leads, must be enclosed within a gas-tight quartz envelope, it has previously been proposed to use the inner wall of the envelope itself as the reaction surface. In that case the reactor can be nothing more than a quartz tube, heated by an external furnace, one end of which serves as an inlet for the gaseous starting material and the other end as the outlet for the gaseous reaction products. Elemental silicon is deposited on the inner walls of the tube. When the starting material is silicon tetraiodide, the gaseous reaction products are elemental iodine along with some unreacted silicon iodide.

Because molten silicon reacts with most oxygen-containing materials and readily picks up certain impurities, particularly boron, significant amounts of which are present in even the purest commerically available quartz, the reaction is preferably carried out at a temperature below the melting point of silicon. Unfortunately, even at these temperatures the results have usually been unsatisfactory. If the reaction temperature is above 1150° C., the silicon is deposited in a voluminous dendritic form. If the temperature is below 1150° C. the deposit is dense but normally adheres so strongly to the quartz surface that the two cannot be separated without great difficulty and considerable danger of contaminating the silicon.

Among the objects of the present invention are the provision of improved methods for preparing elemental silicon suitable for use in the manufacture of semi-conductor base materials; the provision of improved methods for preparing elemental silicon by thermal decomposition of a silicon compound on a heated quartz surface; the provision of methods of the character described wherein the deposit of elemental silicon formed on the quartz surface is dense but easily separated from its quartz base; and the provision of methods of the character described which are simpler and more economical than the methods heretofore available. Other objects and features of the invention will be in part apparent and in part pointed out hereinafter.

The invention accordingly comprises the methods hereinafter described, the scope of the invention being indicated in the following claims.

Figure 2:
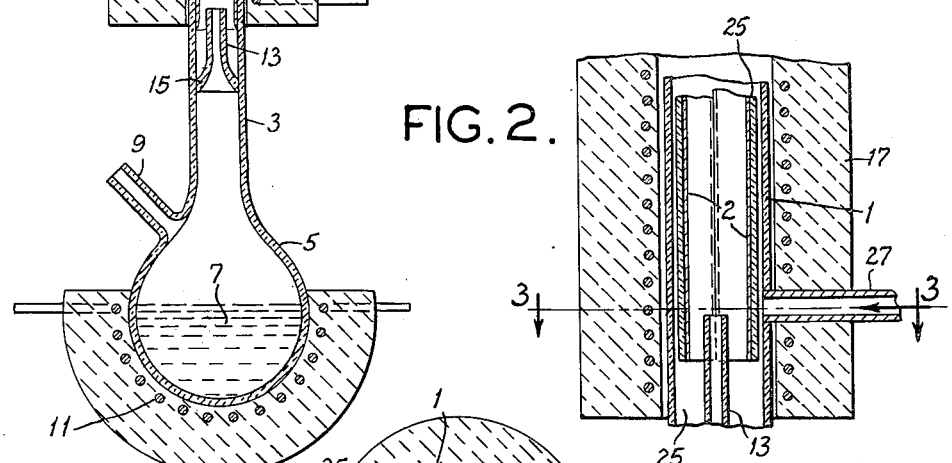
Figure 3:
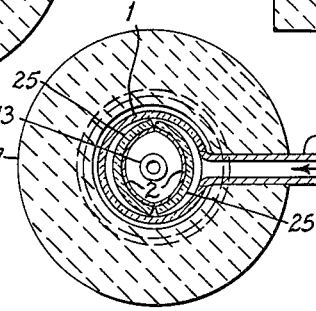

In the accompanying drawing, in which one form of apparatus, and a variant, useful in carrying out the invention is shown, Fig. 1 is a view in section of the apparatus;
Fig. 2 is a fragmentary section of a variant; and
Fig. 3 is a section taken on line 3—3 in Fig. 2.

Corresponding reference characters indicate corresponding parts throughout the drawing.

Referring now to the drawing, which illustrates apparatus particularly useful for decomposing silicon tetraiodide, all parts of the apparatus which come in contact with silicon iodide or elemental sillicon are made from quartz. Reactor tube 1, the interior of which is lined with a coating of fritted silica 2 applied as described hereinafter, is joined by means of a quartz tube 3 to a flask 5 which serves as a boiler for the silicon tetraiodide starting material 7. Tube 3 is provided with a side arm 9 to which may be attached either a manometer or a source of inert gas. The side arm may also be used as an inlet for charging silicon tetraiodide into the boiler. Suitable gas-tight fittings may also be provided at convenient locations to facilitate assembling and disconnecting the various parts of the apparatus. Heat for melting and vaporizing the silicon tetraiodide is provided by an electric mantle 11, the temperature of which can be controlled by means of a variable resistance. The mantle should be of a size and capacity sufficient to heat the silicon tetraiodide charge up to a temperature of about 300° C. An orifice tube 13 is vertically supported inside tube 3 by means of a ring seal 15. The purpose of the orifice is to maintain a somewhat lower pressure in the reactor than in the boiler. Heat for the reactor is provided by a heavy duty electric furnace 17 capable of heating the reactor to a temperature of at least 1150° C. The gaseous products of the decomposition reaction, principally elemental iodine along with unreacted silicon tetraiodide, are condensed and collected in a two-necked condenser flask 19, one neck of which is connected to the outlet end of the reactor by means of tube 21 and the other to a vacuum pump. The condenser is cooled by immersing it in a low-temperature cooling mixture 23, e.g., a mixture of Dry Ice and trichloroethylene.

The lining of fritted silica 2 inside the reactor tube 1, which serves as a frangible barrier between the silicon deposit and the quartz tube, may be applied in various ways. For example, the inside of the tube may be coated with an aqueous suspension of particulate silica, e.g. 200 mesh or finer, which is dried and then partially sintered to a coherent frit. More particularly, after the mold has been coated with this suspension, the water is removed by evacuating or heating the tube or a combination of both. The dried tube is then placed in a furnace at a temperature and for a length of time sufficient to form a fritted coating, but insufficient to fuse the silica to a clear glass. Other volatile liquids may of course be used to prepare the silica suspension for coating the tube.

Alternatively, the frangible coating can also be applied without the use of water, as by rotating fine silica sand inside the tube at a temperature sufficiently high to cause the sand to stick to the side of the tube. Thereafter the sintering process is completed as described above.

The coating should desirably be of a thickness and uniformity sufficient to insure substantially complete and continuous coverage of the quartz reaction surface. The exact thickness of the coating is, however, not critical. Sufficiency of the coating can usually be determined by visual inspection of the quartz and more exact measurement is not necessary. In general, coatings which are about 0.002 to 0.02 in. thick have been found satisfactory. Noncontinuous coatings, which may for example result if there is dirt or grease on the quartz surface being coated, are likely to result in the silicon deposit adhering to the quartz reaction tube. It is therefore desirable to insure a clean surface by rinsing the quartz first with dilute hydrofluoric acid (e.g. about 2%) and then with distilled or deionized water before applying the fritted coating.

In operation, the boiler is charged with silicon tetraiodide, preferably molten. After the apparatus has been assembled and while the reactor is being heated to the reaction temperature at which silicon tetraiodide is thermally decomposed, air is purged from the system with a stream of inert gas such as argon, admitted through the side arm 9. After a suitable length of time, the argon supply is replaced by a manometer and the pressure inside the system is reduced until the silicon tetraiodide, which is suitably heated to a temperature of 160–300° C., begins to boil and its vapor rises through the orifice 13 into the reactor 1. A suitable boil-up rate for a reactor having an internal diameter of 1½ inches and a heated zone approximately 22 inches long is about 3 lbs. of silicon tetraiodide per hour. In this case silicon begins to deposit on the heated walls of the reactor when the internal pressure falls below about 5 mm. Hg. The temperature of the reactor is preferably controlled at 950–1140° C., and decomposition of the silicon tetraiodide vapor with deposition of elemental silicon on the walls of the reactor is continued until substantially all of the silicon tetraiodide in the boiler has been volatilized or until passage of gas through the reactor is finally blocked by the silicon deposit.

While decomposition temperatures in the range of 950–1140° C. are ordinarily preferred, the invention is also useful at higher operating temperatures. For example, if the reaction temperature is above 1150° C., greater yields are possible, but only with some sacrifice in the density of the deposit. The upper reaction temperature is determined by the softening point of the quartz tube. If the temperature is too high, the tube may soften and collapse under vacuum. This temperature usually falls in the region of 1200–1300° C., and will vary somewhat depending upon the properties of the particular quartz being used and other operating conditions.

The silicon deposit obtained by the above method is a substantially hollow cylinder pressed tightly against the inside of the reactor. It consists of densely packed crystals. The silicon can be recovered by breaking the quartz reactor tube, whereupon the silicon and quartz can be separated cleanly with little or no effort. The ease of separation afforded by the method of this invention is quite striking. If the silicon is deposited directly on quartz which has not first been provided with a coating of fritted silica, the elemental silicon adheres so tenaciously to the quartz that the two virtually defy mechanical separation.

Referring now to Figs. 2 and 3, an alternative form of apparatus is shown in part. In this form the portion of the reactor tube within furnace 17 contains a quartz tube 25 split longitudinally in half which serves as the deposition surface. The fritted silica coating 2 lines tube 25 in this embodiment and need not be applied to tube 1. A non-adherent metal deposit is formed on the split quartz liner as described above, and the liner is subsequently lifted away. If care is taken to avoid cracking the liner, it may be recovered for reuse.

Substantial deposition outside the liner is suppressed by injecting the reaction materials through orifice 13 beyond the point where the liner opening rests within reactor tube 1 and continuing the liner into a cool area beyond the deposition zone. An inert purge gas may be introduced through a side arm 27 between the reactor tube and the liner to isolate this area from the reactants.

Numerous modifications may be made in the design and operation of the apparatus. For example, instead of heating the reactor to substantially the same temperature throughout its length, the furnace may be so designed that the temperature gradually increases from the inlet towards the outlet. The increase in temperature with its concomitant increase in the rate of reaction tends to offset the effect of decreasing vapor pressure of silicon tetraiodide and increasing vapor pressure of elemental iodine as silicon is deposited on the walls of the reactor. This modification thereby favors a more uniform deposition of the silicon throughout the length of the reactor.

Moreover, the orifice 13 described above may be omitted. Since silicon tetraiodide cannot exist in the liquid state at pressures below about 5 mm. Hg, which are necessary for the decomposition reaction, it must in that case be volatilized by sublimation rather than by boiling, and the vaporization rate and therefore the rate of production of silicon is diminished accordingly. With the orifice in place it is therefore possible to maintain the boiler at a higher pressure and so keep the silicon tetraiodide in the liquid state.

While the invention has been described in terms of a single reactor tube it will be apparent that the reactor may also advantageously consist of multiple tubes, e.g., a cluster of tubes within a quartz envelope; and/or suitable quartz bodies such as rods or tubes may be located inside the principal reaction tubes in order to increase the deposition surface. In that case, all of the quartz reaction surfaces should be provided with a coating of fritted silica as described above.

In place of using silicon tetraiodide as the thermally decomposable silicon compound, it will be apparent that other silicon compounds such as silicon tetrachloride, halogenated silanes, etc. may be used. Also, the term "thermal decomposition," as used herein, embraces thermal reduction in the presence of hydrogen.

In view of the above, it will be seen that the several objects of the invention are achieved and other advantageous results attained.

As various changes could be made in the above methods without departing from the scope of the invention, it is intended that all matter contained in the above description or shown in the accompanying drawing shall be interpreted as illustrative and not in a limiting sense.

We claim:
1. The method of preparing elemental silicon which comprises passing silicon tetraiodide vapor over a heated quartz surface which has a layer of fritted silica thereupon, which surface is heated to not less than the decomposition temperature of the silicon tetraiodide but below the softening point of quartz.

2. The method of preparing elemental silicon which comprises passing the vapor of a thermally decomposable silicon compound over a quartz surface provided with a frangible coating of fritted silica, which surface is heated to not less than the decomposition temperature of the silicon compound but below the softening point of quartz.

3. The method of preparing elemental silicon which comprises passing silicon tetraiodide vapor over a quartz surface provided with a frangible coating of fritted silica, which surface is heated to a temperature not substantially above 1150° C.

4. The method of preparing elemental silicon which comprises passing silicon tetraiodide vapor over a quartz surface provided with a frangible coating of fritted silica, which surface is heated to a temperature between approximately 950 and 1140° C.

References Cited in the file of this patent

UNITED STATES PATENTS

| | | |
|---|---|---|
| 2,773,745 | Butler et al. | Dec. 11, 1956 |
| 2,904,404 | Ellis | Sept. 15, 1959 |

OTHER REFERENCES

Litton et al.: Journal of the Electrochemical Society, vol. 101, No. 6, June 1954, pages 287–292.

Lyon et al.: Journal of the Electrochemical Society, vol. 96, No. 6, December 1949, pages 359–363.

Fiat Final Report 789, Experiments to Produce Ductile Silicon, April 1946, 5 pages.